(12) United States Patent
Nakai

(10) Patent No.: US 9,488,497 B2
(45) Date of Patent: Nov. 8, 2016

(54) CURRENT CONTROL APPARATUS FOR THREE-PHASE ROTARY MACHINE

(71) Applicant: DENSO CORPORATION, Kariya, Aichi-pref. (JP)

(72) Inventor: Yasuhiro Nakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 14/709,949

(22) Filed: May 12, 2015

(65) Prior Publication Data

US 2015/0333686 A1   Nov. 19, 2015

(30) Foreign Application Priority Data

May 13, 2014 (JP) .................. 2014-099196

(51) Int. Cl.
| | |
|---|---|
| H02P 6/12 | (2006.01) |
| H02P 21/06 | (2016.01) |
| H02P 27/06 | (2006.01) |
| H02P 27/08 | (2006.01) |
| G01D 5/20 | (2006.01) |

(52) U.S. Cl.
CPC .............. *G01D 5/2073* (2013.01); *H02P 6/12* (2013.01); *H02P 21/06* (2013.01); *H02P 21/22* (2016.02); *H02P 27/06* (2013.01); *H02P 27/08* (2013.01)

(58) Field of Classification Search
CPC .......... H02P 6/16; H02P 21/05; H02P 21/06; H02P 25/22; H02P 27/08; H02P 31/00; H02P 6/002
USPC .......... 318/400.02, 400.04, 400.26, 608, 611
See application file for complete search history.

(56) References Cited

U.S. PATENT DOCUMENTS

| | | | | | |
|---|---|---|---|---|---|
| 4,624,002 | A * | 11/1986 | Zahalka | ............... | H05B 3/0023 373/40 |
| 4,631,385 | A * | 12/1986 | Rothermel | ............... | B23K 9/12 219/124.03 |
| 4,811,609 | A * | 3/1989 | Nishibe | .................. | G01L 3/105 73/862.333 |
| 5,726,504 | A * | 3/1998 | Pecukonis | ................. | H02J 3/01 307/105 |
| 5,796,231 | A * | 8/1998 | Kyodo | .................... | H02P 6/183 318/608 |
| 6,056,088 | A * | 5/2000 | Gerstenkorn | ......... | B66B 5/0031 187/390 |
| 6,592,816 | B1 * | 7/2003 | Ebel | ......................... | A61L 2/10 250/455.11 |
| 6,919,979 | B2 * | 7/2005 | Seki | ........................ | B41J 2/473 347/233 |
| 7,724,275 | B2 * | 5/2010 | Choi | ..................... | H04N 1/047 347/235 |

(Continued)

FOREIGN PATENT DOCUMENTS

| | | |
|---|---|---|
| JP | 2009-171312 | 7/2009 |
| JP | 2013-118746 | 6/2013 |
| JP | 2013-250175 | 12/2013 |

*Primary Examiner* — Paul Ip
(74) *Attorney, Agent, or Firm* — Nixon & Vanderhye PC

(57) ABSTRACT

In an apparatus, a synchronizing unit synchronizes a measurement timing of values of first and second phase currents by a current sensor with a measurement timing of a rotational angle of a rotor by a rotational angle sensor. A current calculator calculates, based on the first and second parameter signals and the rotational angle of the rotor, values of two phase currents in a rotational coordinate system defined with respect to the rotor. A transmitter transmits the values of the two phase currents using a communication protocol. A controller communicates with the transmitter using the communication protocol to receive the values of the two phase currents. The controller controls the first phase current, the second phase current, and a third phase current flowing through respective first, second, and third phase windings of a three-phase rotary machine according to the values of the two-phase currents.

7 Claims, 5 Drawing Sheets

(56) References Cited

U.S. PATENT DOCUMENTS

| | | | |
|---|---|---|---|
| 9,385,648 B2* | 7/2016 | Suzuki | B62D 5/0403 |
| 2004/0017598 A1* | 1/2004 | Seki | B41J 2/473 |
| | | | 359/204.1 |
| 2006/0080495 A1* | 4/2006 | Glaser | H04L 7/06 |
| | | | 711/4 |
| 2007/0032933 A1* | 2/2007 | Glaser | B60R 21/013 |
| | | | 701/45 |
| 2007/0275810 A1* | 11/2007 | Sinojima | F16H 37/086 |
| | | | 475/216 |
| 2008/0225321 A1* | 9/2008 | Choi | H04N 1/047 |
| | | | 358/1.13 |
| 2011/0031913 A1* | 2/2011 | Mori | H02P 6/06 |
| | | | 318/400.04 |
| 2013/0322487 A1* | 12/2013 | Watanabe | G01K 7/02 |
| | | | 374/4 |
| 2014/0176027 A1* | 6/2014 | Osaki | H02P 6/002 |
| | | | 318/400.2 |
| 2015/0248370 A1* | 9/2015 | Momeni | B60T 7/042 |
| | | | 710/104 |
| 2015/0333672 A1* | 11/2015 | Sakai | B60L 11/00 |
| | | | 318/400.04 |

* cited by examiner

US 9,488,497 B2

CURRENT CONTROL APPARATUS FOR THREE-PHASE ROTARY MACHINE

CROSS REFERENCE TO RELATED APPLICATION

This application is based on and claims the benefit of priority from Japanese Patent Application No. 2014-099196 filed on May 13, 2014, the disclosure of which is incorporated in its entirety herein by reference.

TECHNICAL FIELD

The present disclosure relates to current control apparatuses for a three-phase rotary machine, and more particularly, to such current control apparatuses capable of controlling a current flowing through each phase winding of a three-phase rotary machine.

BACKGROUND

A known inverter has the ability to control currents flowing through respective three-phase windings of a three-phase motor as an example of three-phase rotary machines. Specifically, a controller of the known inverter obtains actual values of at least first and second currents flowing through corresponding at least first and second phase windings of the three-phase motor using current sensors provided for the corresponding first and second phase windings. The controller also measures an actual rotational angle of a rotor of the three-phase motor using a rotational angle sensor. The known inverter is disclosed in Japanese Patent Application Publication No. 2013-118746, which will be referred to as a patent document 1.

SUMMARY

The controller of the inverter disclosed in patent document 1 will be described in more detail hereinafter. Specifically, the controller of the inverter receives the actual values of the at least first and second phase currents obtained by the corresponding current sensors, and receives the actual rotational angle of the rotor measured by the rotational angle sensor. Then, the controller transforms, using the actual rotational angle of the rotor received thereby, the actual values of the at least first and second phase currents received thereby into values of two-phase currents in a two-phase rotating coordinate system defined relative to the rotor. The controller controls a switching circuit of the inverter to alternately switch a current conduction and a current interruption between a voltage source and each phase winding via the switching circuit. The control of the switching circuit adjusts a value of each of the two-phase currents to match with a target value predetermined for a corresponding one of the two-phase currents.

The transforming of the actual values of the respective at least first and second phase currents to values of the two-phase currents in the two-phase rotating coordinate system requires the actual rotational angle of the rotor measured by the rotational angle sensor. There may be a gap between the timing when the controller receives the actual values of the respective at least first and second phase currents from the corresponding respective current sensors and the timing when the controller receives the actual rotational angle measured by the rotational angle sensor. The gap may result in reduction in the accuracy of transforming, based on the actual rotational angle of the rotor, the actual values of the at least first and second phase currents to values of the two-phase currents in the two-phase rotating coordinate system. It is therefore desirable to provide a creative idea to address the reduction in the transformation accuracy.

In view of the circumstances set forth above, one aspect of the present disclosure seeks to provide a current control apparatus for a three-phase rotary machine, which is designed based on the creative idea to address the reduction in the transformation accuracy.

Specifically, a specific aspect of the present disclosure aims to provide such a current control apparatus that is capable of improving the accuracy of transforming actual values of at least first and second phase currents into value of two-phase currents in a two-phase rotating coordinate system defined in a rotor.

According to an exemplary aspect of the present disclosure, there is provided an apparatus for controlling a three-phase rotary machine including first, second, and third phase stator windings. The apparatus includes a current sensor that measures values of first and second phase currents respectively flowing through at least the first and second phase windings of the three-phase rotary machine, and outputs first and second parameter signals, each of the first and second parameter signals representing the measured value of a corresponding one of the first and second currents. The apparatus includes a rotational angle sensor that measures a rotational angle of a rotor of the three-phase rotary machine. The apparatus includes a synchronizing unit, connected to the current sensor and the rotational angle sensor, for synchronizing a measurement timing of the values of the first and second phase currents for the current sensor with a measurement timing of the rotational angle of the rotor for the rotational angle sensor. The apparatus includes a current calculator that calculates, based on the first and second parameter signals and the rotational angle of the rotor, values of two phase currents in a rotational coordinate system defined with respect to the rotor. The apparatus includes a transmitter that transmits the values of the two phase currents calculated by the current calculator in accordance with a predetermined communication protocol. The apparatus includes a controller that communicates with the transmitter in accordance with the predetermined communication protocol to receive the values of the two phase currents. Based on the values of the two-phase currents, the controller controls the first phase current, the second phase current, and a third phase current flowing through the respective first, second, and third phase windings.

The synchronizing unit of the apparatus synchronizes the measurement timing of the values of the first and second phase currents for the current sensor with the measurement timing of the rotational angle of the rotor for the rotational angle sensor.

This synchronization results in calculation of values of the two phase currents for the current calculator with higher accuracy in comparison to calculation of values of the two phase currents in a case where the measurement timing of the values of the first and second phase currents for the current sensor is asynchronous with the measurement timing of the rotational angle of the rotor for the rotational angle sensor.

The transmitter of the apparatus transmits the values of the two phase currents calculated by the current calculator in accordance with the predetermined communication protocol. The controller communicates with the transmitter in accordance with the predetermined communication protocol to receive the values of the two phase currents. Based on the values of the two-phase currents, the controller controls the first phase current, the second phase current, and a third phase current flowing through the respective first, second, and third phase windings. Thus, even if the apparatus is configured to transmit the values of the two phase currents to the controller in accordance with the predetermined communication protocol, the apparatus results in proper control of the three-phase currents flowing through the respective three-phase windings of the three-phase rotary machine.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

A specific embodiment of the present disclosure will be described hereinafter with reference to the accompanying drawings.

A current control apparatus 10 for controlling a motor-generator (MG) 11, which is an example of a three-phase rotary machines, embodies one aspect of the present disclosure as a specific embodiment. The current control apparatus 10 and the motor-generator 11 are for example installed in a motor vehicle, such as a hybrid vehicle or an electric vehicle.

First, an example of the structure of the current control apparatus 10 for the motor-generator 11 will be described hereinafter with reference to FIG. 1.

Figure 1:
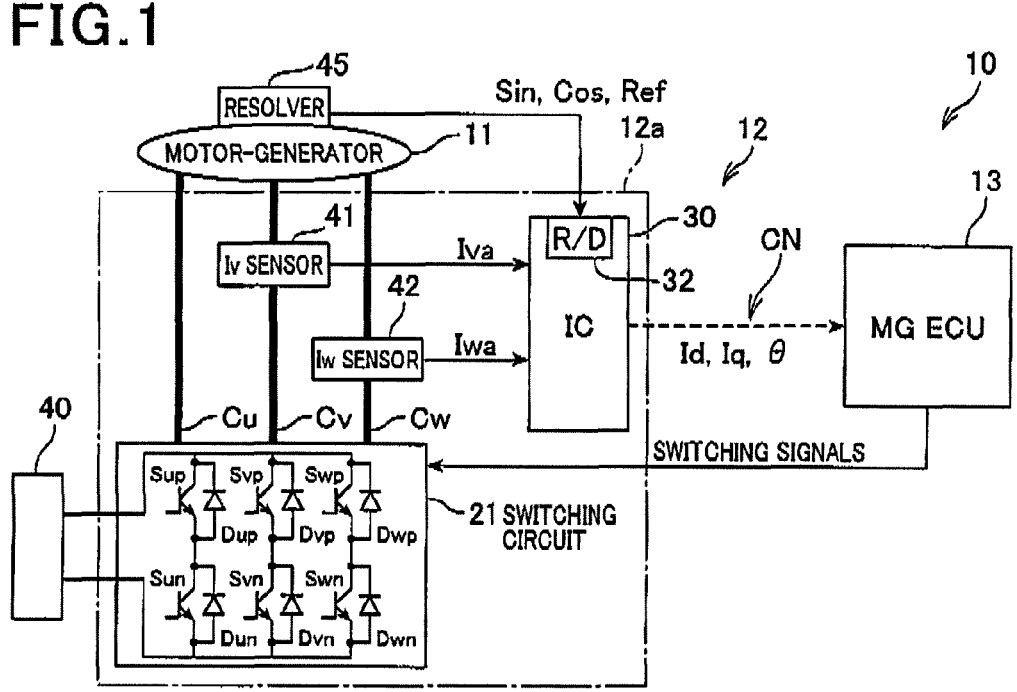
FIG. 1 is a circuit diagram schematically illustrating an example of the structure of a current control apparatus according to an embodiment of the present disclosure.

The current control apparatus 10 includes an inverter 12, and an electronic control unit (ECU) 13 for controlling the motor-generator 11; the motor-generator 11 is illustrated as MG ECU in FIG. 1. The current control apparatus 10 also includes a resolver 45 that is an example of rotational angle sensors.

The motor-generator 11 is coupled to driving wheels of the motor vehicle, and serves as a main engine of the motor vehicle. Specifically, the motor-generator 11 is operative to generate torque for rotatably driving the driving wheels of the motor vehicle. For example, the motor-generator 11 is a three-phase permanent magnet synchronous motor-generator.

Figure 5:
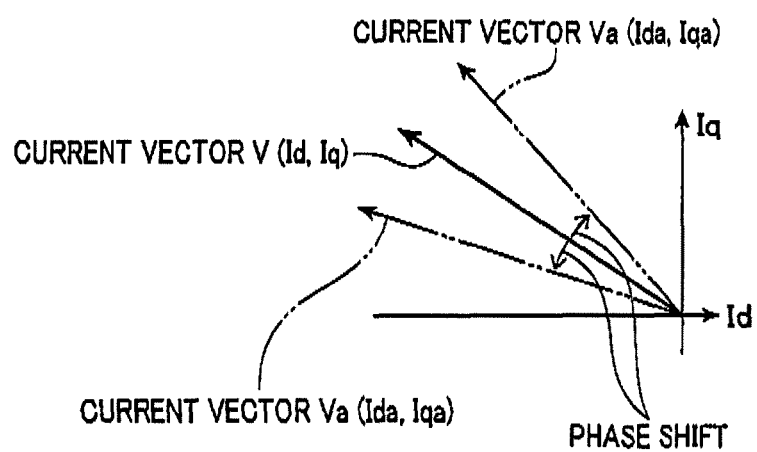
FIG. 5 is a graph schematically illustrating a phase shift of a current vector based on values of d- and q-axis currents in a d-q coordinate system due to sampling-timing asynchronous occurred in a current control system according to the comparative example.

The motor-generator 11 is provided with a rotor and a stator (not shown). The rotor is provided with at least one pair of permanent magnets. The rotor has a direct axis (d-axis) in line with a direction of magnetic flux created by an N pole of the at least one pair of permanent magnets. The rotor also has a quadrature axis (q-axis) with a phase being π/2-radian electrical angle leading with respect to a corresponding d-axis during rotation of the rotor. In other words, the q-axis is electromagnetically perpendicular to the d-axis (see FIG. 5 described later).

The d and q axes constitute a d-q coordinate system, i.e. a two-phase rotating coordinate system, defined relative to the rotor.

The stator includes a stator core such that the rotor is rotatably arranged with respect to the stator core. The stator also includes a set of three-phase windings, i.e. armature windings, wound in the stator core.

The three-phase, i.e. U-, V, and W-phase, stator windings are wound in the stator core such that the U-, V-, and W-phase windings are shifted by an electrical angle of, for example, 2π/3 radian in phase from each other.

For example, the three-phase stator windings, i.e. U-, V-, and W-phase windings, each have a first end connected to a common junction, i.e. a neutral point, and a second end, opposite to the first end, serving as a separate terminal. That is, the three-phase stator windings are connected to each other to have a star-configuration.

Specifically, the motor-generator 11 functions (1) As a motor to generate torque, i.e. motion power, for rotatably driving the driving wheels (2) As a generator to generate electrical power.

The torque generated by the motor-generator 11 turns the driving wheels of the motor vehicle, thus causing the motor vehicle to run.

A DC power source 40 is connected to the motor-generator 11 via the inverter 12. The DC power source 40 is configured to transfer electrical power therefrom to the motor-generator 11 via the inverter 12, and receive electrical power transferred from the motor-generator 11 via the inverter 12.

The inverter 12 is designed as a three-phase inverter. Specifically, the inverter 12 includes a housing 12a, a switching circuit 21, first and second current sensors 41 and 42, and an integrated circuit (IC) 30. The elements 21, 41, 42, and 30 are installed in the housing 12a. The first and second sensors 41 and 42 are illustrated in some of the drawings as Iv sensor and Iw sensor.

The switching circuit 21 includes a first pair of series-connected high- and low-side (upper- and lower-arm) switching elements Sup and Sun, a second pair of series-connected high- and low-side switching elements Svp and Svn, and a third pair of series-connected high- and low-side switching elements Swp and Swn. The switching circuit 12 also includes flywheel diodes Dup, Dun, Dvp, Dvn, Dwp, and Dwn electrically connected in antiparallel to the respective switching elements Sup, Sun, Svp, Svn, Swp, and Swn.

The first to third pairs of switching elements are parallely connected to each other in bridge configuration.

As the switching elements S*# (*=u, v, and w, and #=p and n), IGBTs, MOSFETS, or bipolar transistors can be respectively used. When MOSFETs are used as the switching elements S*#, intrinsic diodes of the power MOSFETs can be used as the flywheel diodes, thus eliminating the need for external flywheel diodes.

A connection point, through which the switching elements Sup and Sun of the first pair are connected to each other in series, is connected to the separate terminal of the U-phase winding via a U-phase cable Cu. Similarly, a connection point, through which the switching elements Svp and Svn of the second pair are connected to each other in series, is connected to the separate terminal of the V-phase winding via a V-phase cable Cv. Moreover, a connection point, through which the switching elements Swp and Swn of the third pair are connected to each other in series, is connected to the separate terminal of the W-phase winding via a W-phase cable Cw.

The star-configuration of the three-phase stator windings results in the sum of three-phase currents flowing through the respective cables Cu, Cv, and Cw being zero in accordance with Kirchhoff's law.

One end of the series-connected switching elements of each of the first, second, and third pairs is connected to the positive terminal of the DC power source 40 via a positive terminal of the inverter 12. The other end of the series-connected switching elements of each of the first, second, and third pairs is connected to the negative terminal of the DC power source 40 via a negative terminal of the inverter 12. Each of the switching elements S*# has a control terminal connected to the MG ECU 13.

The first current sensor 41 is provided in the V-phase cable Cv for measuring a value, i.e. a magnitude, of a V-phase current Iv flowing through the V-phase cable Cv. The second current sensor 42 is provided in the W-phase cable Cw for measuring a value, i.e. a magnitude, of a W-phase current Iw flowing through the W-phase cable Cw. Specifically, the first and second current sensors 41 and 42 are operative to cyclically output, to the IC 30, values of first and second parameter signals, i.e. first and second analog voltage signals Iva and Iwa; the first and second analog voltage signals represent the measured magnitudes of the corresponding respective V- and W-phase currents Iv and Iw.

The resolver 45 has a typical structure that includes a power supply circuit and an excitation coil attached to the rotor of the motor-generator 11 to be rotatable together with the rotor. The resolver 45 also includes first and second detection coils fixedly located to, for example, the stator of the motor-generator 11 to be magnetically linkable to the excitation coil. The first and second detection coils are arranged to have a phase shift of 90 electric degrees therebetween.

The power supply circuit applies a sinusoidal excitation signal, i.e. a sinusoidal AC signal, Ref to the excitation coil. Applying the sinusoidal AC signal to the excitation coil induces a first sinusoidal AC signal and a second sinusoidal AC signal in the respective first and second detection coils. The rotor rotating together with the excitation coil changes the distance between the rotating detection coil and each of the first and second detection coils. The distance change between the rotating excitation coil and the first and second detection coils results in the first and second sinusoidal AC signals whose amplitudes change depending on the rotational angle, i.e. rotational position, of the rotor. The first and second sinusoidal AC signals have a phase shift of 90 electrical degrees therebetween, so that the first and second sinusoidal AC signals serve as first sinusoidal AC signal Sin and a second cosine AC signal Cos.

The resolver 45 cyclically outputs values of the respective sinusoidal excitation signal Ref, first sinusoidal AC signal Sin, and second cosine AC signal Cos to the IC 30.

The IC 30 essentially includes, for example, input/output (I/O) ports, a processing circuit, a communication circuit, and so on. The IC 30 cyclically receives, i.e. samples, via the I/O ports, values of the first and second analog voltage signals Iva and Iwa from the respective first and second current sensors 41 and 42. The IC 30 also cyclically receives, i.e. samples, via the I/O ports, values of the respective sinusoidal excitation signal Ref, first sinusoidal AC signal Sin, and second cosine AC signal Cos from the resolver 45.

The MG ECU 13 is located outside the housing 12a of the inverter 12, and the IC 30 is communicably connected to the MG ECU 13 via a communication network CN, such as a radio communication network or a cable communication network. The communication network CN has a predetermined communication standard, i.e. a predetermined communication protocol, for example, in-vehicle LAN protocol, such as controller area network protocol (CAN protocol), local interconnect network protocol (LIN protocol), or the like. Preferably, a communication network having a higher noise immunity, such as a CAN network based on the CAN protocol or a LIN network based on the LIN protocol is selected as the communication network CN.

The IC 30 calculates, based on the sampled values of the sinusoidal excitation signal Ref, first sinusoidal AC signal Sin, and second cosine AC signal Cos, a rotational angle, i.e. an electrical angle, θ of the rotor of the motor-generator 11 as digital data. The IC 30 also converts sampled values of the first and second analog voltage signals Iva and Iwa into values of first and second digital voltage signals Ivd and Iwd. Then, the IC 30 calculates, based on the values of the first and second digital voltage signals Ivd and Iwd, a value of a third digital voltage signal Iud for the U-phase winding in accordance with Kirchhoff's law.

Then, the IC 30 transforms, based on the rotational angle θ of the rotor of the motor-generator 11, the values of the first to third digital voltage signals Ivd, Iwd, and Iud into a value of a d-axis current Id in digital format and a value of a q-axis current Iq in digital format in the d-q coordinate system defined relative to the rotor.

Then, the IC 30 communicates with the MG ECU 13 in accordance with the predetermined communication protocol matching with the communication network CN to thereby transmit the rotational angle θ of the rotor of the motor-generator 11, and the values of the respective d- and q-axis currents Id and Iq to the MG ECU 13 via the communication network CN.

The MG ECU 13 is designed as, for example, a microcomputer circuit. Specifically, the MG ECU 13 essentially includes, for example, a CPU, a memory, such as a ROM and/or a RAM, an I/O, and a bus connecting between the CPU, memory, and I/O. The MG ECU 13 can include at least one special-purpose electronic circuit.

Specifically, the MG ECU 13 is configured such that the CPU performs instructions of programs stored in the memory, thus performing predetermined software tasks associated with the overall control of the motor-generator 11. The MG ECU 13 can also be configured such that the at least one special-purpose electronic circuit performs predetermined hardware tasks associated with the overall control of the motor-generator 11. The MG ECU 13 can be configured to perform both the software tasks and the hardware tasks associated with the overall control of the motor-generator 11.

The MG ECU 13 communicates with the IC 30 in accordance with the predetermined communication protocol matching with the communication network CN. The communications permit the MG ECU 13 to receive the rotational angle θ of the rotor of the motor-generator 11, and the values of the d- and q-axis currents Id and Iq to the MG ECU 13 transmitted from the IC 30 via the communication network CN.

The MG ECU 13 controls on/off operations of the switching elements Sup, Sun, Svp, Svn, Swp, and Swn of the switching circuit 21 based on the rotational angle θ of the rotor of the motor-generator 11, the value of the d-axis current Id, and the value of the q-axis current Iq.

For example, the MG ECU 13 compares the values of the d- and q-axis currents Id and Iq with corresponding d- and q-axis command current values Id* and Ice calculated based on three-phase command current values Iu*, Iv*, and Iw*; the three-phase command current values Iu*, Iv*, and Iw* are determined based on, for example, a command value for at least one controlled variable of the motor-generator 11. This comparison calculates a d-axis deviation between the value of the d-axis current Id and the d-axis command current value Id*, and a q-axis deviation between the value of the q-axis current Iq and the q-axis command current value Iq*. The MG ECU 13 performs, for example, a proportional-integral (PI) operation using the d-axis deviation as input data, and a proportional gain term and an integral gain term of a PI feedback control algorithm (PI algorithm), thus calculating a command d-axis voltage such that the d-axis deviation converges to zero. The MG ECU 13 performs, for example, a PI operation using the q-axis deviation as input data, and a proportional gain term and an integral gain term of a PI feedback control algorithm, thus calculating a command q-axis voltage such that the q-axis deviation converges to zero.

The MG ECU 13 converts the command d-axis voltage and command q-axis voltage into three-phase sinusoidal command voltages using the rotational angle θ of the rotor. The MG ECU 13 compares in amplitude each of the three-phase sinusoidal command voltages with a triangular PWM carrier signal having a predetermined period corresponding to a predetermined frequency. The MG ECU 13 generates, based on the results of the comparison, switching signals, i.e. drive signals, for the respective switching elements Sup, Sun, Svp, Svn, Swp, and Swn.

Each of the switching signals is, for example, a pulse signal with a controllable duty cycle (controllable pulse width) for a corresponding switching cycle that matches with the predetermined period of the triangular PWM carrier signal. Then, the MG ECU 13 transmits the switching signals to the control terminals of the corresponding respective switching elements Sup, Sun, Svp, Svn, Swp, and Swn, thus performing on/off operations of the switching elements Sup, Sun, Svp, Svn, Swp, and Swn. Control of the on/off operations of the switching elements Sup, Sun, Svp, Svn, Swp, and Swn adjusts three-phase, i.e. U-, V-, and W-phase, currents Iu, Iv, and Iw flowing through the respective three-phase windings of the motor-generator 11 to the respective three-phase command current values Iu*, Iv*, and Iw*.

Figure 2:
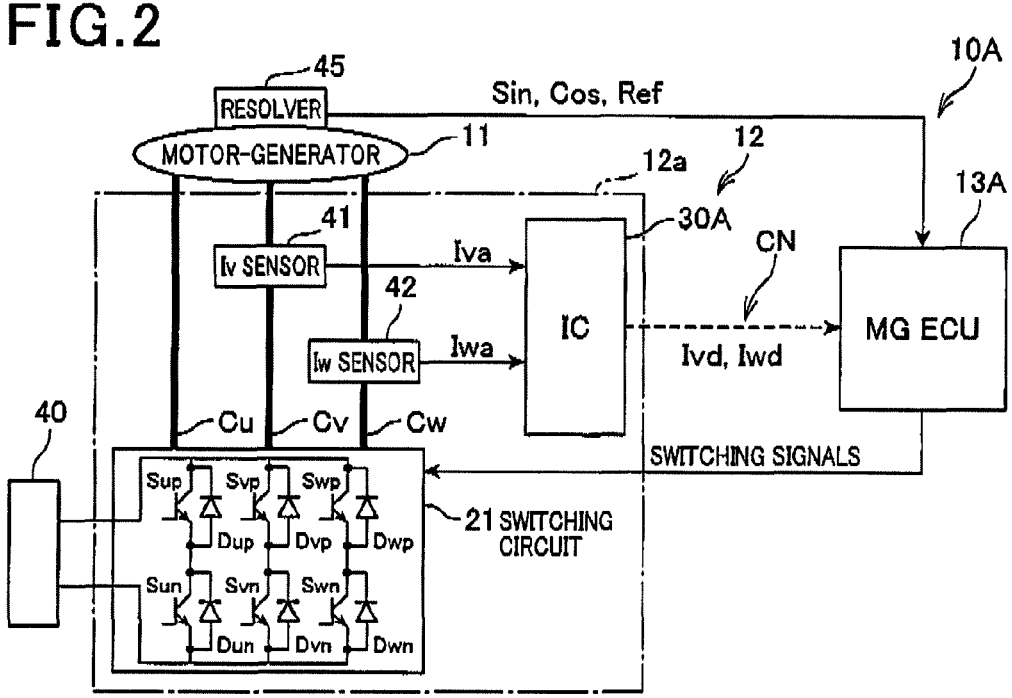
FIG. 2 is a circuit diagram schematically illustrating an example of the structure of a current control apparatus according to a comparative example of the embodiment.

In contrast, FIG. 2 schematically illustrates a current control system 10A for the motor 11 according a comparative example of this embodiment. The structure and functions of the current control system 10A according to the comparative example are mainly different from the current control apparatus 10 according to this embodiment by the following points. So, identical parts between the comparative example and this embodiment, to which identical reference characters are assigned, are omitted or simplified to avoid redundant description.

The current control system 10A includes an IC 30A and a MG ECU 13A in place of the IC 30 and the MG ECU 13.

The IC 30A cyclically receives, i.e. samples, via the I/O ports, values of the respective first and second analog voltage signals Iva and Iwa input thereto from the respective first and second current sensors 41 and 42, and converts the values of the respective first and second analog voltage signals Iva and Iwa into values of first and second digital voltage signals Ivd and Iwd.

The IC 30A communicates with the MG ECU 13A in accordance with the predetermined communication protocol matching with the communication network CN to thereby transmit the values of the first and second digital voltage signals Ivd and Iwd to the MG ECU 13A via the communication network CN.

The MG ECU 13A communicates with the IC 30A in accordance with the predetermined communication protocol matching with the communication network CN. The communications permits the MG ECU 13A to receive the values of the first and second voltage signals Ivd and Iwd transmitted from the IC 30A via the communication network CN.

In addition, the MG ECU 13A cyclically receives, i.e. samples, values of the respective sinusoidal excitation signal Ref, first sinusoidal AC signal Sin, and second cosine AC signal Cos input thereto from the resolver 45. The MG ECU 13A calculates, based on the sampled values of the sinusoidal excitation signal Ref, first sinusoidal AC signal Sin, and second cosine AC signal Cos, a rotational angle, i.e. an electrical angle, θ of the rotor of the motor-generator 11 in digital format. The MG ECU 13A also calculates, based on the values of the first and second digital voltage signals Ivd and Iwd, a value of a third digital voltage signal Iud in digital format for the U-phase winding in accordance with Kirchhoff's law.

Then, the MG ECU 13A transforms, based on the rotational angle θ of the rotor of the motor-generator 11, the values of the first, second, and third digital voltage signals Ivd, Iwd, and Iud into a value of a d-axis current Ida in digital format and a value of a digital q-axis current Iqa in digital format in the d-q coordinate system defined relative to the rotor.

Figure 4:
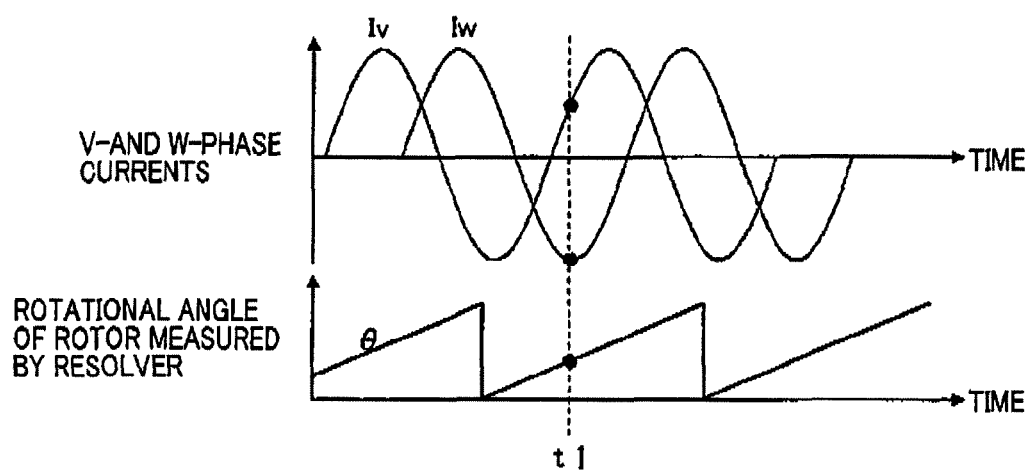
FIG. 4 is a graph schematically illustrating how V- and W-phase currents change over time, and an angle of a rotor of the motor-generator changes over time.

Precise transformation of values of the d- and q-axis currents Ida. and Iqa in digital format in the d-q coordinate system necessitates that values of the V- and W-phase currents Iv and Iw, which are measured by the first and second current sensors 41 and 42 at time t1, is synchronized with a rotational angle of the rotor, which is measured by the resolver 45 at the same time t1 (see FIG. 4).

Figure 3:
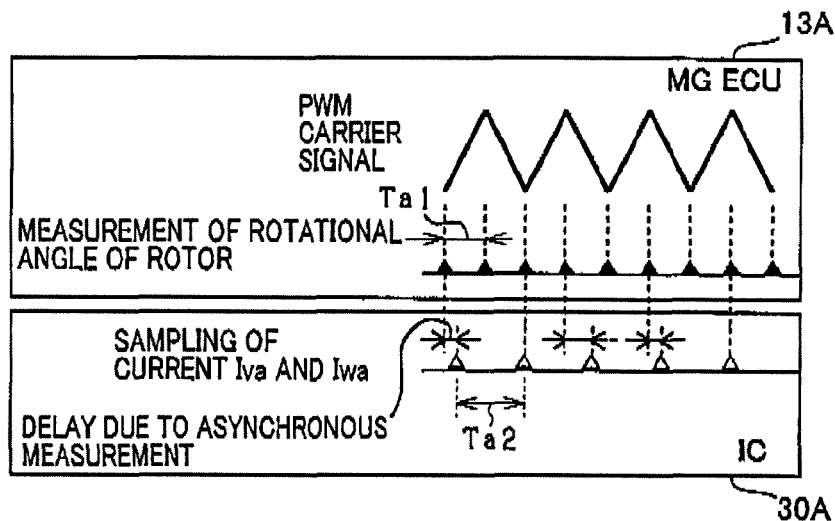
FIG. 3 is a timing chart schematically illustrating measurement timings of values of first and second analog voltage signals from a motor-generator, and measurement timings of values of respective sinusoidal excitation signal, first sinusoidal AC signal, and second cosine AC signal from the motor-generator according to the comparison example.

Referring to FIG. 3, the resolver 45 of the current control apparatus 10A is configured to transmit values of the respective sinusoidal excitation signal Ref, first sinusoidal AC signal Sin, and second cosine AC signal Cos every predetermined cycle Ta1. In other words, the MG ECU 13A is configured to sample values of the respective sinusoidal excitation signal Ref, first sinusoidal AC signal Sin, and second cosine AC signal Cos from the resolver 45 every predetermined cycle Ta1. The values of the respective sinusoidal excitation signal Ref, first sinusoidal AC signal Sin, and second cosine AC signal Cos are finally converted into a corresponding rotational angle θ of the rotor by the MG ECU 13A, so that the cycle Ta1 represents a cycle of measurement of the rotational angle θ of the rotor. The cycle Ta1 is previously determined according to the period of the triangular PWM carrier signal. For example, FIG. 3 shows that the cycle Ta1 is substantially set to half of the period of the triangular PWM carrier signal.

In addition, the IC 30A is configured to sample values of the respective first and second analog voltage signals Iva and Iwa input thereto from the respective first and second current sensors 41 and 42 every predetermined cycle Ta2; the cycle Ta2 is set to be, for example, longer than the cycle Ta1. The IC 30A is also configured to convert the sampled values of the respective first and second analog voltage signals Iva and Iwa into values of first and second digital voltage signals Ivd and Iwd in digital format, and transmit the values of the first and second digital voltage signals Ivd and Iwd to the MG ECU 13A via the communication network CN.

That is, let us assume that (1) A cyclic sampling timing, by the MG ECU 13A, of values of the respective sinusoidal excitation signal Ref, first sinusoidal AC signal Sin, and second cosine AC signal Cos from the resolver 45 will be referred to as a first cyclic sampling timing (2) A cyclic sampling timing, by the IC 30A, values of the respective first and second analog voltage signals Iva and Iwa input thereto from the respective first and second current sensors 41 and 42 will be referred to as a second cyclic sampling timing (3) The first cyclic sampling timing is synchronized with the second cyclic sampling timing.

Even if the assumption is satisfied, the analog-digital conversion process and the communication process carried out by the IC 30A delays, by a certain amount of time, a sampling timing of the values of the first and second voltage signals Ivd and Iwd to the MG ECU 13A with respect to a corresponding sampling timing of values of the respective sinusoidal excitation signal Ref, first sinusoidal AC signal Sin, and second cosine AC signal Cos to the MG ECU 13A.

In other words, the structure of the current control apparatus 10A results in a sampling timing of the values of the first and second voltage signals Ivd and Iwd to the MG ECU 13A being asynchronous to a corresponding sampling timing of values of the respective sinusoidal excitation signal Ref, first sinusoidal AC signal Sin, and second cosine AC signal Cos to the MG ECU 13A.

As described above, the MG ECU 13A transforms, based on the rotational angle θ of the rotor of the motor-generator 11, the values of the first, second, and third digital voltage signals Ivd, Iwd, and Iud into a value of the d-axis current Ida and a value of the q-axis current Iqa in the d-q coordinate system defined relative to the rotor. Thus, the sampling-timing asynchronicity may result in a phase shift of a current vector Va (Ida, Iqa) of the values of the d- and q-axis currents Id and Iq in the d-q-coordinate system with respect to a current vector V (Id, Iq) that is obtained when no sampling-timing asynchronicity occurs (see FIG. 5).

In contrast, the IC 30 of the current control apparatus 10 according to this embodiment is configured to synchronize a sampling timing of the values of the first and second analog voltage signals Iva and Iwa thereto and a corresponding sampling timing of values of the respective sinusoidal excitation signal Ref, first sinusoidal AC signal Sin, and second cosine AC signal Cos thereto. This means that values of the V- and W-phase currents Iv and Iw, which are measured by the first and second current sensors 41 and 42 at time t1, is synchronized with a rotational angle of the rotor, which is measured by the resolver 45 at the same time t1 (see FIG. 4).

Figure 6:
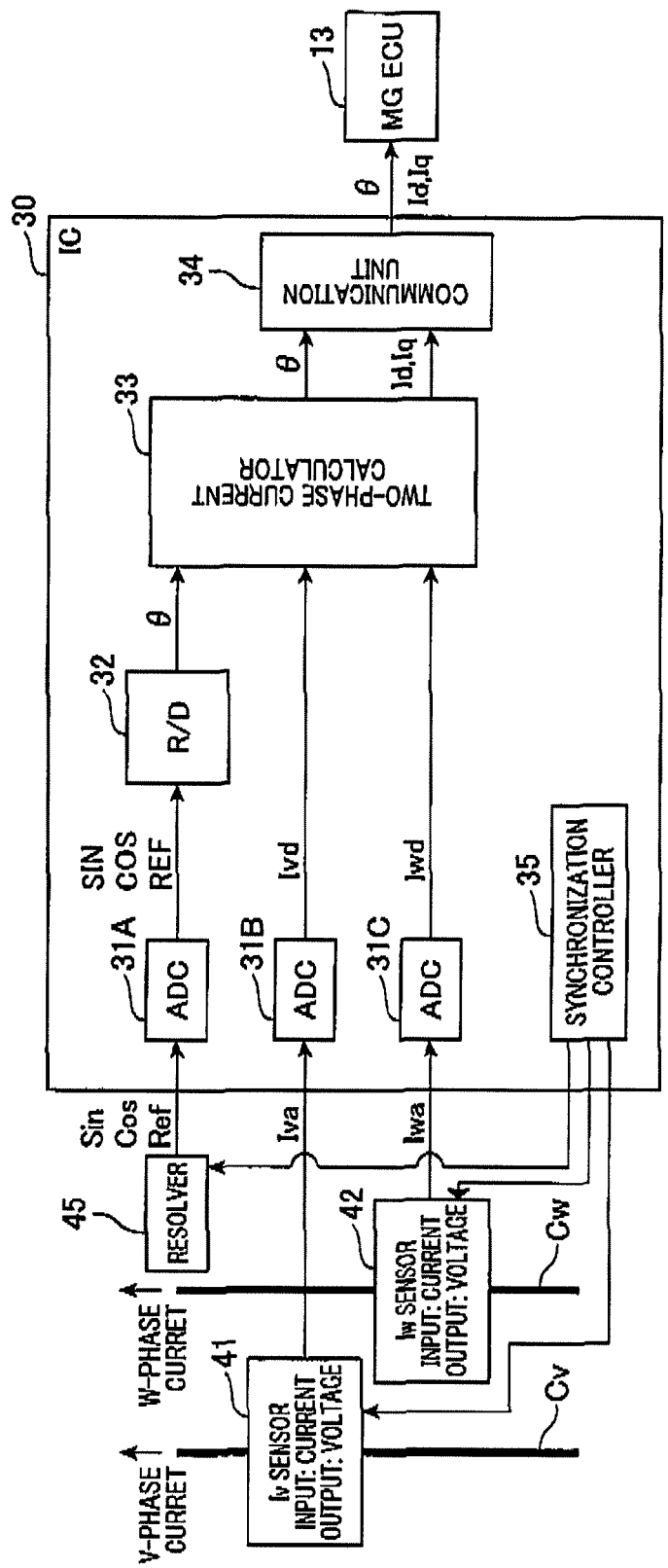
FIG. 6 is a block diagram schematically illustrating an example of the structure of an IC illustrated in FIG. 1.

FIG. 6 schematically illustrates a block diagram schematically illustrating functional modules included in the IC 30; these functional modules are implemented by, for example, the I/O ports, the processing circuit, and the communication circuit of the IC 30. The IC 30 can include hardware modules functionally matching with the functional modules illustrated in FIG. 6 or hardware-software hybrid modules functionally matching with the functional modules illustrated in FIG. 6.

Referring to FIG. 6, the IC 30 includes a first A/D converter 31A, a second A/D converter 31B, a third A/D converter 31C, a resolver/digital converter (R/D converter) 32, a two-phase current calculator 33, a communication unit 34, and a synchronization controller 35.

The synchronization controller 35 is operatively connected to the first current sensor 41, the second current sensor 42, and the resolver 45. The synchronization controller 35 controls the first current sensor 41, the second current sensor 42, and the resolver 45 such that (1) The first current sensor 41 measures a magnitude of the V-phase current in a predetermined cycle Ta3, and outputs a value of the first analog voltage signal Iva representing the measured magnitude of the V-phase current to the IC 30

(2) The second current sensor 42 measures a magnitude of the W-phase current in the predetermined cycle Ta3 in synchronization with measurement of a magnitude of the V-phase current by the first current sensor 42

(3) The resolver 45 measures the first sinusoidal AC signal Sin and second cosine AC signal Cos, and outputs values of the respective sinusoidal excitation signal Ref, first sinusoidal AC signal Sin, and second cosine AC signal Cos to the IC 30 in the predetermined cycle Ta3 in synchronization with measurement of a magnitude of each of the V- and W-phase currents by a corresponding one of the first and second current sensors 41 and 42.

For example, a value of the first analog voltage signal Iva increases in proportion to an increase of a measured magnitude of the V-phase current. Similarly, a value of the second analog voltage signal Iwa increases in proportion to an increase of a measured magnitude of the W-phase current.

The A/D converter 31B receives, i.e. samples, a value of the first analog voltage signal Iva sent from the first current sensor 41 in the predetermined cycle Ta3, and converts the value of the first analog voltage signal Iva into a value of the first digital voltage signal Ivd in digital format.

The A/D converter 31C receives, i.e. samples, a value of the second analog voltage signal Iwa sent from the second current sensor 42 in the predetermined cycle Ta3, and converts the value of the second analog voltage signal Iwa into a value of the second digital voltage signal Iwd in digital format.

Each of the A/D converters 31B and 31C outputs the value of a corresponding one of the first and second voltage signals Ivd and Iwd in digital format to the two-phase current calculator 33.

The A/D converter 31A receives, i.e. samples, values of the respective sinusoidal excitation signal Ref, first sinusoidal AC signal Sin, and second cosine AC signal Cos in the predetermined cycle Ta3. Then, the A/D converter 31A converts the values of the respective sinusoidal excitation signal Ref, first sinusoidal AC signal Sin, and second cosine AC signal Cos into values of digital signals REF, SIN, and COS. The A/D converter 31A outputs the values of the digital signals REF, SIN, and COS to the R/D converter 32.

That is, the synchronization controller 35 and the A/D converters 31A to 31C serve as a synchronizing unit, i.e. synchronizing means, for synchronizing a measurement timing, i.e. a sampling timing, of values of the first and second analog voltage signals Iva and Iwa from the motor-generator 11 with a measurement timing, i.e. a sampling timing, of the first sinusoidal AC signal Sin and second cosine AC signal Cos from the motor-generator 11.

The R/D converter 32 has a typical structure that includes a cosine multiplier, a sine multiplier, a low-pass filter, and so on. Specifically, the R/D converter 32 receives the values of the digital signals REF, SIN, and COS. Then, the R/D converter 32 performs predetermined calculations based on the received values of the digital signals SIN and COS and synchronized detection based on the value of the digital signal REF, thus converting the digital signals SIN and COS into a rotational angle, i.e. an electrical angle, θ of the rotor of the motor-generator 11 in digital format. Then, the R/D converter 32 outputs the rotational angle θ of the rotor of the motor-generator 11 to the two-phase current calculator 33.

The two-phase current calculator 33 calculates the values of the first and second digital voltage signals Ivd and Iwd, a value of the third digital voltage signal Iud for the U-phase winding in accordance with Kirchhoff's law.

Then, the two-phase current calculator 33 transforms, based on the rotational angle θ of the rotor of the motor-generator 11, the values of the first to third digital voltage signals Ivd, Iwd, and Iud into a value of the d-axis current Id in digital format and a value of the q-axis current Iq in digital format in the d-q coordinate system defined relative to the rotor. For example, the two-phase current calculator 33 has map data or equation data. The map data or equation data represents correlations between values of the first to third digital voltage signals Ivd, Iwd, and Iud, values of the d- and q-axis currents, and values of the rotational angle θ of the rotor. Thus, the two-phase current calculator 33 refers to the map data or equation data using the values of the first to third digital voltage signals Ivd, Iwd, and Iud and the rotational angle θ of the rotor. Based on the results of the reference, the two-phase current calculator 33 extracts values of the d- and q-axis currents that match with the values of the first to third digital voltage signals Ivd, Iwd, and Iud and the rotational angle of the rotor. Thereafter, the two-phase current calculator 33 outputs the extracted values of the d- and q-axis currents and the rotational angle θ of the rotor to the communication unit 34.

The communication unit 34 communicates with the MG ECU 13 in accordance with the predetermined communication protocol matching with the communication network CN to thereby transmit the rotational angle θ of the rotor of the motor-generator 11, and the values of the respective d- and q-axis currents Id and Iq to the MG ECU 13 via the communication network CN.

As described above, the MG ECU 13 receives the rotational angle θ of the rotor, and the values of the d- and q-axis currents Id and Iq based on communications with the IC 30 via the communication network CN. Then, the MG ECU 13

(1) Calculates a command d-axis current and a command q-axis current based on the received rotational angle θ of the rotor, and the values of the d- and q-axis currents Id and Iq (2) Converts the command d-axis voltage and command q-axis voltage into three-phase sinusoidal command voltages using the rotational angle θ of the rotor and the predetermined PWM carrier signal (3) Generates, based on the results of comparison between the three-phase sinusoidal command voltages and the PWM carrier signal, switching signals for the respective switching elements Sup, Sun, Svp, Svn, Swp, and Swn, thus controlling on/off operations of the switching elements Sup, Sun, Svp, Svn, Swp, and Swn based on the respective switching signals.

These operations of the MG ECU 13 adjust the three-phase, i.e. U-, V-, and W-phase, currents Iu, Iv, and Iw flowing through the respective three-phase windings of the motor-generator 11 to the respective three-phase command current values Iu*, Iv*, and Iw*.

Figure 7:
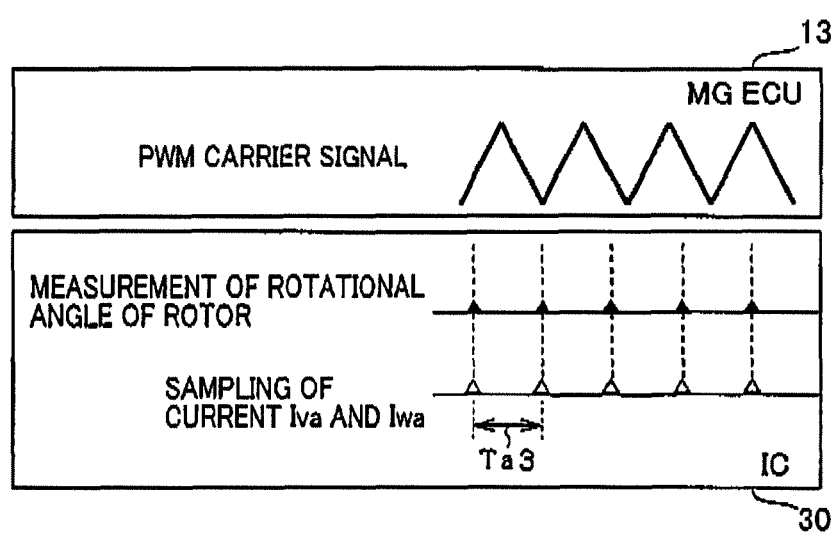
FIG. 7 is a timing chart schematically illustrating measurement timings of values of first and second analog voltage signals from the motor-generator, and measurement timings of values of respective sinusoidal excitation signal, first sinusoidal AC signal, and second cosine AC signal from the motor-generator according to the embodiment.

FIG. 7 schematically illustrates measurement timings, i.e. sampling timings, of values of the first and second analog voltage signals Iva and Iwa from the motor-generator 11, and measurement timings, i.e. sampling timings, of values of the respective sinusoidal excitation signal Ref, first sinusoidal AC signal Sin, and second cosine AC signal Cos from the motor-generator 11.

Specifically, the IC 30

(1) Samples a value of each of the first and second analog voltage signals Iva and Iwa in the predetermined cycle Ta3 from the motor-generator 11.

(2) Samples values of the respective sinusoidal excitation signal Ref, first sinusoidal AC signal Sin, and second cosine AC signal Cos in the predetermined cycle Ta3 from the motor-generator 11 in synchronization with sampling of a value of each of the first and second analog voltage signals Iva and Iwa (see MEASUREMENT OF ROTATIONAL ANGLE OF ROTOR in FIG. 7).

Note that the IC 30 is capable of setting the predetermined cycle Ta3 to a constant value independently of the period of the PWM carrier signal, or changing the predetermined cycle Ta3 depending on change of the period of the PWM carrier signal. For example, the IC 30 is capable of decreasing the cycle Ta3 with a decrease of the period of the PWM carrier signal.

As described above, the current control system 10 synchronizes each sampling timing of values of the first and second analog voltage signals Iva and Iwa from the motor-generator with a corresponding sampling timing of values of the respective sinusoidal excitation signal Ref, first sinusoidal AC signal Sin, and second cosine AC signal Cos in the predetermined cycle Ta3 from the motor-generator 11.

This synchronization results in calculation of values of the d- and q-axis currents according to this embodiment with higher accuracy in comparison to calculation of those of the d- and q-axis currents according to the comparison example in which each sampling timing of values of the first and second analog voltage signals Iva and Iwa from the motor-generator 11 is asynchronous with a corresponding sampling timing of values of the respective sinusoidal excitation signal Ref, first sinusoidal AC signal Sin, and second cosine AC signal Cos.

The IC 30 of the current control system 10 is configured to transmit the rotational angle θ of the rotor of the motor-generator 11, and the values of the respective d- and q-axis currents Id and Iq to the MG ECU 13 via the communication network CN in accordance with the predetermined communication protocol. This configuration instructs the MG ECU 13 to control on/off operations of the switching elements Sup, Sun, Svp, Svn, Swp, and Swn, thus adjusting the three-phase currents Iu, Iv, and Iw flowing through the respective three-phase windings of the motor-generator 11 to the respective three-phase command current values Iu*, Iv*, and Iw*.

Thus, even if the current control apparatus 10 is configured to transmit the values of respective d- and q-axis currents Id and Iq to the MG ECU 13 in accordance with the predetermined communication protocol, the current control apparatus 10 results in proper control of the three-phase currents Iu, Iv, and Iw flowing through the respective three-phase windings of the motor-generator 11.

The current control apparatus 10 uses a commercially available resolver 45 as a rotational angle sensor, and the IC 30 is provided with the R/D converter 32 that converts values of the respective sinusoidal excitation signal Ref, first sinusoidal AC signal Sin, and second cosine AC signal Cos measured by the resolver 45 from the motor-generator 11 into the rotational angle θ of the rotor of the motor-generator 11. That is, the A/D functions of values of the first and second analog voltage signals Iva and Iwa measured by the respective current sensors 41 and 42 and the R/D functions of values of these analog signals Ref, Sin, and Cos into a digital rotational angle θ of the rotor of the motor-generator 11 are integrated in the IC 30. This integration simplifies the circuit configuration of the current control apparatus 10.

The current control apparatuses 10 according to this embodiment can be modified at least as follows.

The current control apparatus 10 according to this embodiment uses the resolver 45 as a rotational angle sensor, but can use another type rotational angle sensor, such as an optical or a magnetic encoder.

The current control apparatus 10 is equipped with the first and second current sensors 41 and 42 for outputting the first and second parameter signals representing measured magnitudes of the respective V- and W-phase currents Iv and Iw, but the present disclosure is not limited thereto, Specifically, the current control apparatus 10 can be provided with, in addition to the first and second current sensors 41 and 42, a third current sensor for measuring the magnitude of the U-phase current Iu flowing through the U-phase winding, and outputting a third parameter signal representing the measured magnitude of the U-phase current Iu.

As the motor-generator 11, a typical motor or a power generator, such as an alternator, can be used. The motor-generator 11 is designed as a permanent magnet synchronous motor-generator, but can be designed as an induction motor or another type of synchronous motor.

The IC 30 is configured to transmit digital signals to the MG ECU 13 located outside the housing 12a of the inverter 12 via communications with the MG ECU 13, but can be configured to transmit digital signals to the MG ECU 13 located outside the package of the IC 30 via communications with the MG ECU 13.

The R/D converter 32 has a function of receiving values of the digital signals REF, SIN, and COS, and performs predetermined calculations based on the received values, thus converting the digital signals SIN and COS into a rotational angle θ of the rotor of the motor-generator 11 in digital format. The present disclosure is however not limited to the structure of the R/D converter 32. Specifically, the R/D converter 32 can be configured to generate the sinusoidal excitation signal, and apply the sinusoidal excitation signal to the excitation coil. In this modification, the resolver 32 does not need to transmit the excitation signal to the R/D converter 32. The R/D converter 32 can also have a function of the A/D converter 31A.

The synchronization controller 35 is provided separately from the A/D converters 31A to 31C, although the present disclosure is not limited thereto. Specifically, at least one of the A/D converter 31A to 31C includes such a synchronization controller 35 for synchronizing a measurement timing, i.e. a sampling timing, of values of the first and second analog voltage signals Iva and Iwa from the motor-generator 11 with a measurement timing, i.e. a sampling timing, of the first sinusoidal AC signal Sin and second cosine AC signal Cos from the motor-generator 11.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a three-phase rotary machine including first, second, and third phase stator windings, the apparatus comprising:
    a current sensor that measures values of first and second phase currents respectively flowing through at least the first and second phase windings of the three-phase rotary machine, and outputs first and second parameter signals, each of the first and second parameter signals representing the measured value of a corresponding one of the first and second currents;
    a rotational angle sensor that measures a rotational angle of a rotor of the three-phase rotary machine;
    means, connected to the current sensor and the rotational angle sensor, for synchronizing a measurement timing of the values of the first and second phase currents for the current sensor with a measurement timing of the rotational angle of the rotor for the rotational angle sensor;
    a current calculator that calculates, based on the first and second parameter signals and the rotational angle of the rotor, values of two phase currents in a rotational coordinate system defined with respect to the rotor;
    a transmitter that transmits the values of the two phase currents calculated by the current calculator in accordance with a predetermined communication protocol; and
    a controller that communicates with the transmitter in accordance with the predetermined communication protocol to receive the values of the two phase currents, and controls the first phase current, the second phase current, and a third phase current flowing through the respective first, second, and third phase windings according to the values of the two-phase currents.

2. The apparatus according to claim 1, wherein:
    the rotational angle sensor is a resolver that:
        measures, based on a sinusoidal excitation signal, a first AC signal and a second AC signal, the first and second AC signals having a phase shift of 90 electrical degrees therebetween; and
        outputs at least the first AC signal and the second AC signal; and
    the current calculator comprises a resolver/digital converting unit that receives at least the first AC signal and the second AC signal, and converts the first AC signal and the second AC signal into the rotational angle of the rotor.

3. The apparatus according to claim 2, wherein the transmitter is configured to transmit the rotational angle of the rotor measured by the rotational angle sensor to the controller in accordance with a predetermined communication protocol.

4. The apparatus according to claim 3, further comprising:
an inverter having a housing and converting DC power to AC power and applying the AC power to the three-phase windings of the three-phase rotary machine, wherein:
the controller is configured to control the inverter based on the values of the two-phase currents, thus controlling the first phase current, the second phase current, and the third phase current flowing through the respective first, second, and third phase windings;
at least the synchronizing means, the current calculator, and the transmitter are installed in the housing of the inverter;
the controller is located outside the housing of the inverter; and
the transmitter is configured to transmit at least the values of the two phase currents calculated by the current calculator to the controller in accordance with the predetermined communication protocol.

5. The apparatus according to claim 2, further comprising:
an inverter having a housing and converting DC power to AC power and applying the AC power to the three-phase windings of the three-phase rotary machine, wherein:
the controller is configured to control the inverter based on the values of the two-phase currents, thus controlling the first phase current, the second phase current, and the third phase current flowing through the respective first, second, and third phase windings;
at least the synchronizing means, the current calculator, and the transmitter are installed in the housing of the inverter;
the controller is located outside the housing of the inverter; and
the transmitter is configured to transmit at least the values of the two phase currents calculated by the current calculator to the controller in accordance with the predetermined communication protocol.

6. The apparatus according to claim 1, wherein the transmitter is configured to transmit the rotational angle of the rotor measured by the rotational angle sensor to the controller in accordance with a predetermined communication protocol.

7. The apparatus according to claim 6, further comprising:
an inverter having a housing and converting DC power to AC power and applying the AC power to the three-phase windings of the three-phase rotary machine, wherein:
the controller is configured to control the inverter based on the values of the two-phase currents, thus controlling the first phase current, the second phase current, and the third phase current flowing through the respective first, second, and third phase windings;
at least the synchronizing means, the current calculator, and the transmitter are installed in the housing of the inverter;
the controller is located outside the housing of the inverter; and
the transmitter is configured to transmit at least the values of the two phase currents calculated by the current calculator to the controller in accordance with the predetermined communication protocol.

* * * * *